United States Patent [19]

Degani

[11] Patent Number: 5,211,764

[45] Date of Patent: May 18, 1993

US005211764A

[54] SOLDER PASTE AND METHOD OF USING THE SAME

[75] Inventor: Yinon Degani, Highland Park, N.J.

[73] Assignee: AT&T Bell Laboratories, Murray Hill, N.J.

[21] Appl. No.: 973,908

[22] Filed: Nov. 10, 1992

[51] Int. Cl.$^5$ .................................................. B23K 35/34
[52] U.S. Cl. .................................... 148/25; 148/23; 148/24
[58] Field of Search ........................... 148/23-25

[56] References Cited

U.S. PATENT DOCUMENTS 3,963,529  6/1976  Tsunashima ........................ 148/25
4,495,007  1/1985  Fado ................................... 148/25

OTHER PUBLICATIONS

Hwang, J. S., *Solder Paste in Electronic Packaging*, (1989), Van Nostrand, Reinhold, NY., publishers.

*Primary Examiner*—Peter D. Rosenberg
*Attorney, Agent, or Firm*—Bruce S. Schneider

[57] ABSTRACT

A solder paste that is useful in applications such as surface mounting of components on printed circuit boards has been found. After soldering, the residue requires no cleaning. The achievement of these desirable properties is accomplished by employing a solder flux vehicle including a three component residue modifier.

16 Claims, No Drawings

SOLDER PASTE AND METHOD OF USING THE SAME

BACKGROUND OF THE INVENTION

1. Field of the Invention

This invention relates to soldering of electronic components and in particular to soldering involving solder fluxes and solder pastes.

2. Art Background

For many applications electronic components are surface mounted on a printed wiring board (PWB). This surface mounting is accomplished by positioning a component on a metallic contacting region of a PWB and introducing a solder paste between the leads and the corresponding contact pads. The assembly is then heated to a reflow temperature at which the soldering material flows and an electrically conductive joint between the lead and the solder contact pad is formed.

The solder paste in this soldering process contains solder balls of relatively small dimension, i.e., balls having a diameter in the range 5 $\mu$m to 100 $\mu$m, and a vehicle i.e., flux. The solder balls are used to ensure the presence of sufficient electrical conductor to produce a low resistance joint between the component lead and the PWB contacting pad. The flux is employed to yield a variety of properties necessary for the soldering process. In particular, the flux is chosen so that it is possible to print the paste onto the contacting pads of the PWB through a stencil without depositing essentially any paste in other regions of the PWB. The paste is also chosen 1) to have good tackiness so that when the component lead is pressed onto the paste, it remains in position and 2) so that at the reflow temperature any solder in the paste that is not precisely aligned with the contacting pads moves into the desired pad region through surface interactions. The flux also contains a dissolving agent that removes any oxide coating from the solder balls, the contacting pads and from the component leads.

In addition to all the other requirements placed on the solder flux, it is essential that after reflow any residue which remains is either non corrosive and cosmetically appealing or is removable by cleaning. Very few fluxes are available that leave no undesirable residue. Most fluxes leave residues which are cleaned with organic solvents. Environmental considerations presently have imposed strong impetus to formulate fluxes so that residue is removable with an aqueous medium.

Although aqueous cleanable residues are acceptable, the additional step of cleaning represents a concomitant additional cost. Therefore, although not essential, it is certainly desirable to formulate a solder flux that leaves no objectionable residues even without a cleaning procedure. A solder flux that satisfies all the required properties for the vehicle and that also produces no unacceptable residue is extremely difficult to formulate. This difficulty in formulation is especially severe, since any residue remaining must not hinder subsequent electrical testing of componends by applying a probe to the solder connection.

SUMMARY OF THE INVENTION

The desired properties of a flux vehicle together with the absence of essentially any harmful residue in a non-corroding medium is possible by a specific choice of components. In particular, the flux components should include an acid to remove oxide, a printing modifier (preferably ethyl cellulose) to yield the desired viscosity and tackiness, a solvent for the remaining components of the vehicle, and most significantly, a combination of chemicals that are present in low concentration, that do not fully evaporate in the reflow process and that control the physical softness and cosmetic appearance of the printing modifier residue. An exemplary combination includes castor oil, pentaerythritol tetrabenzoate (PETB) or bis(2-ethyl hexyl) sebacate, and 3) rosin or dimerized rosin. A solvent vehicle containing such three component mixtures as well as a suitable acid and printing modifier, is then used in a reflow process in the presence of nitrogen or other inert gas. A combination of the specific vehicle and reflow in an inert environment produces a solder joint that is essentially free of any objectionable residue and allows testing. Indeed, residue is only observable at $\times 20$ magnification and then only after scraping the residue layer from the solder joint and is present essentially only on the reflowed solder. Thus, the residue that is present, in fact, provides protection from corrosion of the underlying solder.

Exemplary fluxes include not only castor oil, pentaerythritol tetrabenzoate or bis(2-ethyl hexyl) sebacate, and rosin or dimerized rosin, but also acids such as diphenic and sebacic acid, as well as ethyl cellulose as a printing modifier and a solvent system of propyl paraben in combination with di or tripropylene glycol.

DETAILED DESCRIPTION

As discussed, the inventive soldering fluxes are employed in a soldering process where a first conductor, e.g., an electronic component having electrically conductive leads, is soldered to a second conductive region such as runners in a PWB. Additionally, production of the reflow temperature which is typically in the range 130° C. to 340° C. is done by conventional techniques such as heat conduction, convection, radiation, or hot vapor condensation. The general procedure of soldering by subjecting components to be soldered and the intervening solder paste to heat sufficient to produce reflow is described in J. S. Hwang, *Solder Paste in Electronic Packaging*, (1989), Van Nostrand, Reinhold, NY., publishers. Reflow should be done in an inert environment, i.e., an environment having a concentration of oxidant (such as oxygen) less than 600 parts per million. For example, a nitrogen environment is employed.

The solder flux includes solder particles and a flux. The use of the term solder particles is generic and it is not employed to connote a specific shape. Typically, the volume of the particles (irrespective of shape) should be equivalent to the volume of a ball having a diameter in the range 5 to 100 $\mu$m. Generally, larger particles are not entirely desirable because of poor printing properties, while smaller particles have high surface area which promotes oxidation and tends to produce solder balling. The composition of the solder alloy is not critical and includes, for example, common solder alloys such as tin/lead (63/37; 5/95 wt. %) tin/silver (96.5/3.5 wt. %) tin/antimony (95/5 wt. %), and tin/bismuth (42/58 wt. %).

As discussed, the flux should contain a solvent for the solid materials, a printing modifier, an acid that removes oxide from the solder, and a three component mixture for controlling the cosmetic/physical propertier of the residue. Various acids are suitable as oxide removing materials. Generally, the acid should have a vapor pressure at 180° C. of less than 20 Torr. Typical suitable acids include diphenic acid, sebacic acid, suberic acid and 2-phenoxy benzoic acid. Generally, the acids should be present in a weight percentage of between 1 and 8% of the vehicle composition.

The printing modifier is generally present in a weight percentage of between 1 and 7% of the vehicle composition. High percentages produce undesirable residue, while lower percentages produce insufficient viscosity. The printing modifier is employed to yield the desired viscosity and tackiness, as well as shear thinning, i.e., the reduction of viscosity upon application of a shearing force. Typically, the rheological properties of the vehicle are adjusted using the printing modifier to yield a solder paste with a viscosity in the range 700,000 to 1,500,000 centipoises. Generally, polymers having molecular weight greater than 50,000 grams/mole are suitable for producing the desired viscosity and tackiness. Useful materials that substantially thin upon application of a shearing force and that yield a tacky material in the desired viscosity range, include, for example, ethyl cellulose and ethyl-hydroxy ethyl cellulose.

A three constituent component of the flux vehicle is employed to yield a cosmetically accepted residue that allows probe testing. This component includes 1) castor oil, 2) pentaerythritol tetrabenzoate or bis(2-ethyl hexyl) sebacate, and 3) rosin or dimerized rosin. Each of these three components should be present in concentrations between 1 and 5 wt. % of the flux. Weight percentages greater than 5% for each one leads to undesirable amounts of residue while weight percentages less than 1% provide degraded appearance and homogeneosity of the residue.

A solvent is also used to ensure that the various other components of the flux vehicle are solubilized at room temperature. Generally, the solvent involves a multicomponent combination including an alcohol and a material containing an aromatic group. For example, the printing modifiers such as ethyl cellulose, and acids such as diphenic and sebacic co-solvent systems include di or tri-propylene glycol and propyl 4-hydroxy benzoic acid (propyl paraben). Generally, the solvent constitutes the remaining weight percentage of the vehicle system beyond that employed for the acid; the printing modifier; and the residue appearance/physical modifying components. For the example of tri-propylene glycol and propyl paraben, generally the latter constitutes between 18 and 28 wt. % of the total flux system.

A suitable solvent for the particular materials employed together with the residue reducing component is easily determined using a controlled sample. However, generally the vapor pressure of the solvent should be lower than 0.5 Torr at 23° C. and should be greater than 10 Torr at the reflow temperature.

The following examples are illustrative of the inventive flux composition and processes for their use.

EXAMPLE 1

Flux Preparation

A mixture of 4 gms sebacic acid, 23 gms proply paraben, 4.5 gms ethyl cellulose, 3 gms dimerized rosin, 3 gms PETB and 58.5 gms of di-propylene glycol was heated in an oil bath that was kept at 130° C. The mixture was mechanically stirred during the process. After 40 minutes, 4 gms of castor oil were added to the hot mixture. After 5 minutes, the mixture was removed from the hot oil bath and allowed to cool to ~70° C.

Solder Paste Preparation

One hundred gms of the hot flux (70° C.-80° C.) from Example 1 where mixed with 900 gms of solder powder Sn/Pb 63/37, −325+500 mesh to yield 1 kg of solder paste.

Flux #2

Prepared as flux #1 using 2.5 gms sebacic acid, 25 gms propyl paraben, 4.5 gms ethyl cellulose, 3 gms dimerized rosin, 3 gms PETB, 3 gms castor oil and 59 gms of tripropylene glycol.

Flux #3

Prepared as flux #1 using 5 gms diphenic acid, 3.5 grams ethyl cellulose, 3 gms PETB, 1.5 gms dimerized rosin, 2 gms castor oil, 2 gms bis(2-ethyl hexyl) sebacate, 25 gms propyl paraben, 57 gms tri-propylene glycol.

I claim:

1. A process for soldering a multiplicity of components to a substrate, said process comprising the steps of 1) subjecting said components and said substrate to a paste wherein said paste comprises solder particles and a vehicle, and 2) heating said paste to the reflow temperature in an inert environment characterized in that said vehicle comprises an acid, a viscosity modifier, a solvent composition, and a mixture wherein said mixture comprises A) a rosin or a dimerized rosin, B) castor oil, and C) pentaerythritol tetrabenzoate or bis(2-ethyl hexyl) sebacate.

2. The process of claim 1 wherein said solvent comprises an alcohol and an aromatic compound.

3. The process of claim 2 wherein said solvent comprises di or tripropylene glycol and propyl 4-hydroxy benzoic acid.

4. The process of claim 1 wherein said viscosity modifier comprises a polymer having molecular weight greater than 50,000.

5. The process of claim 4 wherein said polymer comprises ethyl cellulose or ethyl-hydroxy ethyl cellulose.

6. The process of claim 1 wherein said acid comprises a member chosen from the group consisting of diphenic acid, sebacic acid, suberic acid, and 2-phenoxy benzoic acid.

7. The process of claim 5 wherein said acid constitutes between 1 and 8 wt. % of said vehicle.

8. The process of claim 1 wherein said printing modifier is present in a weight percent of between 1 and 7% of said vehicle.

9. The process of claim 1 wherein said solder paste has a viscosity in the range 700,000 to 1,500,000 centipoise.

10. The composition of claim 1 wherein each component of said mixture is present in a concentration between 1 and 5 wt. % of said flux.

11. A solder paste comprising solder particles and a vehicle wherein said vehicle comprises an acid, a viscosity modifier, and a solvent composition characterized in that said vehicle also includes a mixture comprising A) a rosin or dimerized rosin, B) castor oil, and C) pentaerythritol tetrabenzoate or bis(2-ethyl hexyl) sebacate.

12. The paste of claim 11 wherein said solvent comprises an alcohol and an aromatic compound.

13. The paste of claim 12 wherein said solvent comprises di or tripropylene glycol and propyl 4-hydroxy benzoic acid.

14. The paste of claim 11 wherein said viscosity modifier comprises a polymer having molecular weight greater than 50,000.

15. The paste of claim 14 wherein said polymer comprises ethyl cellulose or ethyl-hydroxy ethyl cellulose.

16. The paste of claim 11 wherein said acid comprises a member chosen from the group consisting of diphenic acid, sebacic acid, suberic acid, and 2-phenoxy benzoic acid.

* * * * *